United States Patent [19]
Reynolds

[11] 3,749,322
[45] July 31, 1973

[54] METHOD OF IMPACT MILLING AND ASPIRATING SCRAP INSULATED WIRE TO RECOVER METAL VALVES

[75] Inventor: Donald R. Reynolds, Cheshire, Conn.

[73] Assignee: Entoleter, Inc., Hamden, Conn.

[22] Filed: Apr. 3, 1972

[21] Appl. No.: 240,648

[52] U.S. Cl............ 241/24, 29/403, 29/427, 209/3, 241/14, 241/27, 241/29
[51] Int. Cl............................................ B07b 13/10
[58] Field of Search ............... 29/403, 427; 241/14, 241/19, 60, 61, 24, 27, 29; 209/3, 12

[56] References Cited
UNITED STATES PATENTS

| | | | |
|---|---|---|---|
| 2,750,120 | 6/1956 | Pallman | 241/27 |
| 3,004,721 | 10/1961 | Notzold | 241/27 X |
| 3,074,653 | 1/1963 | Schorsch | 241/60 X |
| 3,268,179 | 8/1966 | Glynn et al. | 241/19 |
| 3,670,969 | 6/1972 | Terada | 241/27 |
| 3,705,694 | 12/1972 | Slocum | 241/14 |

Primary Examiner—Charles W. Lanham
Assistant Examiner—D. C. Reiley, III
Attorney—Nelson E. Kimmelman et al.

[57] ABSTRACT

This process for recovering metal values from scrap wire involves a preliminary first screening and removal of magnetic portions. Then there is a second granulation and screening followed by centrifugal impact milling of the desired screened products. The milling products, i.e., the pieces of bare wire, the loose insulation, and the pieces of wire with insulation still on them are then aspirated to remove the free insulation. The aspirated residue is then screened, impact milled and aspirated for a second time thereby extracting fine pieces of chopped bare copper or aluminum with an insignificant amount of insulation adhering thereto.

11 Claims, 2 Drawing Figures

METHOD OF IMPACT MILLING AND ASPIRATING SCRAP INSULATED WIRE TO RECOVER METAL VALVES

BACKGROUND OF DISCLOSURE

1. Field of Disclosure

This disclosure concerns apparatus and a method for recovering metal values from scrap and in particular to recovery of copper or aluminum from scrap wire.

2. Prior Art

Known methods of recovery of wire from wire scrap include various burning or incineration processes, carried out either in open pits, or under portable incinerators placed over large piles, or in internal permanent incinerators. These methods were characterized by strong tendencies to pollute the air, by the use of heavy machinery and hoists, or by expensive installations requiring rigorous safety and anti-fire precautions. Moreover, these heat methods often oxidized or embrittled the metal which degraded its quality. Other methods involved chopping the scrap wire, screening the chopped products and then passing them over so-called air or gravity tables. These methods involved relatively expensive equipment and at best attained yields of approximately 85 percent copper or aluminum.

It is therefore among the objects of the present disclosure to provide less expensive methods and apparatus for reclamation of the wire from scrap wire. These novel methods and apparatus are characterized by long life and dependability and a higher yield of recovered metal.

SUMMARY OF THE DISCLOSURE

Process of reclaiming wire from scrap wire includes (1) reducing the size of scrap wire, (2) impact milling it to remove the insulation from the wire and (3) aspirating the milled product to seaprate the bare wire pieces from the insulation pieces.

DETAIL DESCRIPTION OF THE DRAWINGS

Figure 1:
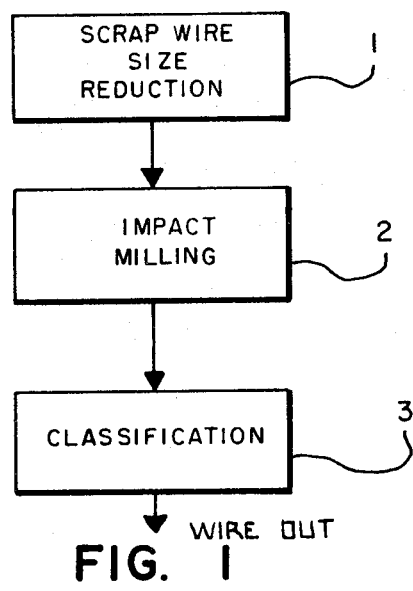
FIG. 1 is a block diagram of the main steps of the disclosure.

FIG. 1 shows the three main steps of the present disclosure. The first main step 1 is the reduction of the scrap wire in size by conventional cutting, chopping or granulation techniques. The second step 2 is to apply the desired products of the size reduction to centrifugal impact mills. These mills, such as the CentriMil produced and marketed by Entoleter, Inc. of Hamden, Conn., fling the cut-up bare and insulated wire particles at high speed outwardly against circular rows of rotating and/or stationary impacting pins known as "impactors." Such mills are described generally in U. S. Pat. No. 3,102,781. The high energy developed by the high speed centrifugal force has several effects. It knocks residual insulation still remaining on cut pieces of wire off of the wire. It also tends to force the copper or aluminum still remaining in small pieces of cut insulated wire thrugh the insulation so that the insulation comes off as short intact tubular pieces. It is not known exactly how this is accomplished but perhaps the answer lies in the fact that the wire is much more dense than the plastic insulation and therefore absorbs considerably greater energy when hit by the impactors than does the considerably less dense plastic. In a way, an analogy might be the batting of a baseball with a loose cover wherein the dense inner core travels considerably farther than the cover because of its much greater absorption of energy. The third step finally, the small pieces of bare wire, free plastic insulation, and the negligble amount of wire with insulation adhering thereto are classified by aspiration.

Figure 2:
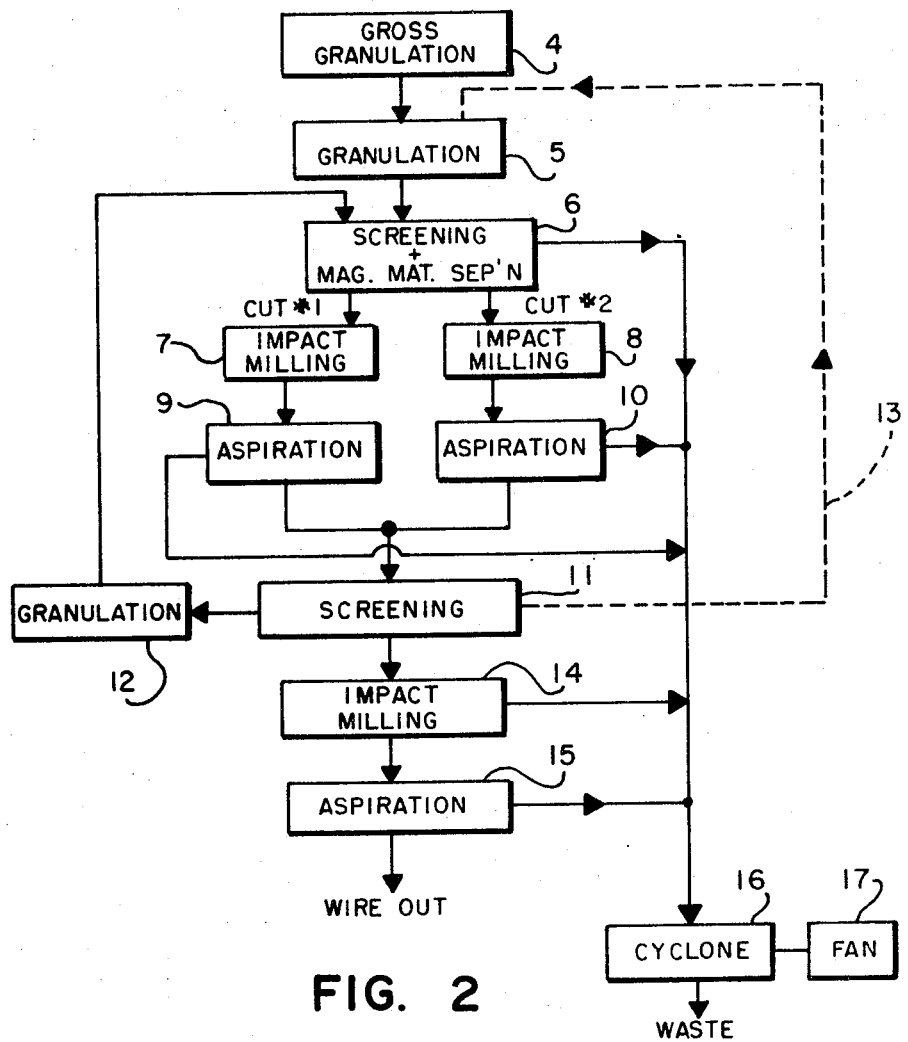
FIG. 2 is a more detailed block diagram of the practical application of the main process steps shown in FIG. 1.

FIG. 2 depicts a complete practical process and apparatus for accomplishing the efficient reclamation of metals from scrap wire. In step 4, the large masses of scrap wire are first applied to cutting or chopping apparatus for cutting the tangled wire coils or other forms of raw scrap wire so that they may be supplied to subsequent processing steps. The scrap wire may be of all sizes and types including multi-conductor telephone cable. This gross granulation step 4 can be accomplished in the ALSTEELE Hog chopper marketed by the above-mentioned Entoleter, Inc. The output of the Hog is then applied to a second granulator in step 5 which may be a heavy duty granulator of the type which is marketed by ALSTEELE or equivalent. Alternatively, to increase throughput, the output of the Hog may be applied to two granulators in parallel whose output is applied to the screening step 6. Transfer of the output of the Hog to the next granulator may be done by any conventional conveyor, by bucket elevator, by hand, etc. The second granulator, as well as all other granulators discussed, are equipped with various types of output screens whose mesh specifications are determined by the type of material being chopped. The output of the granulators in step 5 is considerably smaller than the output of the Hog in step 4 and is applied to any appropriate screening apparatus 6 by any appropriate conveying means such as a conveyor, a bucket elevator or a pneumatic system. The screening step 6 may also include separation of ferrous or magnetic materials by strong magnets.

Depending upon the number of "cuts" or fractions desired, the output of the screening step (which may involve several different horizontal screens placed over one another, for example) may be split into two or more parallel paths. For example, if the screen has two vertically displaced screens with respectively larger and smaller mesh, the fraction passing through the top screen but retained on top of the second screen may be considered as cut No. 1 and applied to an input mill in step 7.

The impact mill in step 7 may be of the type previously referred to above. It has been found that very satisfactory results are obtained if the row or rows of downwardly projecting pins or impactors of the stator and the upwardly projecting pins of the rotor are caused to intermesh, i.e., one or more rows of the rotor extend upwardly between at least two adjacent circular rows of the impactors in the stator, or vice versa. In practice it has been found that Entoleter rotor M4L3 has produced excellent results.

The fraction which has passed through both the top coarse screen and the bottom finer screen may be considered as cut No. 2 and is applied to another impact mill in step 8. This impact mill may also be of the same type as those previously discussed.

After impact milling both cuts, the milled products are separately applied to two separate aspirators in steps 9 and 10. Such aspirators are well known in the classifying art. Alternatively, it is also possible to use aspirators which are closely coupled in a common housing with the impact mills. Such combined mill-aspirators are described in U. S.Pat. No. 2,529,679 and in U. S. Pat. No. 3,463,313. In both of these mill aspirators, the upper portion of the housing includes an impact mill which mills the desired product and causes it to assume a vortical downward flow under the influence of gravity onto a conical surface whence it is dispersed outwardly across an annular zone. In the zone there is an upward flow of gas which is at a predetermined volume and velocity so as to lift from the miled product the lighter particles which are then sucked out of the machine. At the same time, the heavier particles fall downwardly into a collecting pin or hopper. In the application of such combined impact mill-aspirators to the present process, the upward draft of aspirating air will carry away lighter particles such as the insulation which has been separated from the more dense wire particles.

As shown in FIG. 2, the waste or insulation from steps 9 and 10 is applied to a cyclone 16 driven by a fan 17. Also, the larger particles remaining on top of the screen in step 6 are applied to the cyclone. The cyclone will tend to extract any remaining metallic particles and these can be, for example, applied to any point in the processing cycle, e.g., to the input of the second screening step 11, if desired. The waste plastic is removed from the process by the fan 17.

The outputs of both aspirating steps 9 and 10 may then be applied to second screening step 11 by conventional transport means such as conveyors, bucket elevators, etc. The screen is equppied with one or more screens. The "overs" or those particles retained on top of one of the screens can be recycled via a third granulator 12 to the input of the first screening step 6 if desired. Alternatively, these "overs" may be applied directly by any conventional means to the input of the second granulation step 5 as shown by broken-line 13. The smaller particles which pass through the screen are mostly comprised of particles of bare wire and a small percentage having some plastic insulation still adhering thereto. Therefore, the output of the second screening step 7 is applied to a second impact milling step 14 by any conventional conveying and feeding method. The mill used in this step can be the same as the ones previously discussed and, if desired, may be closely coupled to an aspirator to accomplish the subsequent aspiration step 15 as previously described. In this aspirator as well as in some or all of the previous aspirators or impact mill-aspirator combinations, the aspirator portion surfaces on which the milled product lands in a swirling fashion after processing by the mill may be made rough so that as the milled product moves thereon, these surfaces will abrade some of the plastic insulation still adhering to the wire away from it. The flow of air in this aspiration step will remove still more of the freed plastic insulation which is extracted from the process by the action of cyclone 16 and fan 17. The completely processed wire appearing at the output of the second aspiration step 15 is then conveyed to appropriate containers or packages.

The practice of the foregoing process has resulted in attainment of a throughput of 2,000 lbs. of (1/8 inch screen) communcation wire scrap per hour using 10 horsepower, using an Entoleter M4L3 cast iron rotor at 3,500 RPM.

It should be understood, of course, that many different variations, additions and omissions may be introduced into the present process without departing from its main features as summarized in the discussion of FIG. 1 above. For example, the impact mill may have located just outside the periphery of the high-speed rotor one or more circular rows of pins or impactors having any desired shape or arrangement. The numbers or spacing of the impactors both in the stator, in the rotor, or in the region just outside the rotor may be chosen to fit the particular type of scrap wire being processed. In addition to the optional extra rows of pins or impactors disposed just outside the periphery of the rotor, the surfaces of the housing surrounding the rotor may be corrugated so as to increase abrasion of plastic insulation from wire particles to which it is still attached. In some instances, the second screening operation 11 may be dispensed with if the product of the aspiration stages 9 and 10 is of sufficiently high metallic concentration. As stated above, the third granulation step 12 can be dispensed with.

It has also been found that when scrap wire is processed, minute slivers of wire may become lodged in the plastic insulation. To prevent this, it is often desirable to disperse fine inexpensive talc in the first two impact milling steps 7 and 8. This talc, being extremely light, will be extracted from the process in the aspiration steps 9 or 10 and disposed of together with the plastic waste.

The novel wire recovery system described above is especially useful for producers of wire who often generate considerable amounts of scrap wire and are faced with the problem of its disposal. Many such manufactureers collect the scrap, arrange for pick up by scrap dealers and audit and control the scrap disposal system to maintain the balance of materials. Installation of the above-described system can help to reduce the costs incident to disposal of scrap by outside sources by utilizing the labor involved in the wire manufacture process for the scrap operation as well. Also, control of material balance is expedited by permitting auditing of the yield of the scrap reclamation process on an hourly basis, if desired.

In FIG. 2 it would be possible to use magnetic extraction of ferrous materials not only before, during or after screening step 6 but after any granulation step or at any other desired point in the process.

The "throughs," i.e., those aspirated products which penetrate all of the various screens in screening step 11, may be sufficiently high in content of bare wire products that the additional impact milling step 14 may not be necessary and can be dispensed with.

It should be realized that the characteristics of the various granulators such as rotational speed, type of knives or cutters, screen size, etc. as well as the number and mesh of the screens in the screening steps will depend on the materials in the wire insulation and in the wire itself, the gauge of the wire, the size of the wire pieces, etc. Similarly the speed of the rotor in the impact mill, the size and number of the impactors, the type of liner used, the geometry of the aspirator and surfaces, the air flow characteristics of the aspirator, etc., will also be dependent upon the input scrap wire characteristics and the size, nature, and shape of the products to be milled or aspirated.

Since still other modifications of the present process, which do not depart from the essence thereof, will occur to those skilled in the art upon perusal of this specification and drawings, the invention should be limited solely by the claims which follow.

I claim:

1. A substantially dry process for recovering metal values from scrap insulated wire and the like comprising:
   a. comminuting said scrap wire to reduce said scrap wire to small pieces,
   b. impact milling said comminuted scrap wire, and
   c. aspirating said milled product thereby to separate bare wire pieces from other pieces of the product of said milling.

2. The process according to claim 1 wherein said (a) step includes the application of said wire scrap to at least one stage of chopping and wherein the product of said chopping is screened prior to its application to said (b) tep.

3. The process according to claim 1 wherein said aspiration step is performed immediately after said impact milling step and in closely coupled relationship thereto.

4. The process according to claim 1 wherein insulated wire pieces which remain following said aspiratin step are subjected to an additional impact milling step.

5. The process according to claim 4 wherein said additional impact milling step is followed by an additional aspiration step.

6. The process according to claim 2 wherein said screening step also includes magnetic extraction of unwanted magnetic materials.

7. The process according to claim 4 wherein there is a second screening step after said aspiration step.

8. The process according to claim 2 wherein a portion of the output of said second screening step is chopped and returned to one of said chopping stages.

9. The process according to claim 7 wherein a portion of the output of said second screening step is applied to size reduction apparatus and thence returned to the input of the first screening step.

10. The process according to claim 5 wherein said additional input milling step is closely coupled to said additional aspiration step.

11. The process according to claim 1 wherein primarily non-metallic values are extracted at predetermined points in said process and applied to a fluid energy classifying means.

* * * * *